(12) United States Patent
Sevenich et al.

(10) Patent No.: US 10,585,945 B2
(45) Date of Patent: Mar. 10, 2020

(54) METHODS OF GRAPH-TYPE SPECIALIZATION AND OPTIMIZATION IN GRAPH ALGORITHM DSL COMPILATION

(71) Applicant: Oracle International Corporation, Redwood Shores, CA (US)

(72) Inventors: Martin Sevenich, Palo Alto, CA (US); Sungpack Hong, Palo Alto, CA (US); Alexander Weld, Mountain View, CA (US); Hassan Chafi, San Mateo, CA (US); Martijn Dwars, San Francisco, CA (US)

(73) Assignee: Oracle International Corporation, Redwood Shores, CA (US)

( * ) Notice: Subject to any disclaimer, the term of this patent is extended or adjusted under 35 U.S.C. 154(b) by 212 days.

(21) Appl. No.: 15/666,310

(22) Filed: Aug. 1, 2017

(65) Prior Publication Data

US 2019/0042661 A1    Feb. 7, 2019

(51) Int. Cl.
*G06F 17/30*    (2006.01)
*G06F 16/901*    (2019.01)
(Continued)

(52) U.S. Cl.
CPC ............ *G06F 16/9024* (2019.01); *G06F 8/30* (2013.01); *G06F 8/34* (2013.01); *G06F 8/4441* (2013.01); *G06F 16/2453* (2019.01)

(58) Field of Classification Search
CPC .... G06F 16/9024; G06F 16/2453; G06F 8/30; G06F 8/34
(Continued)

(56) References Cited

U.S. PATENT DOCUMENTS 5,805,863 A    9/1998 Chang
5,822,587 A    10/1998 McDonald
(Continued)

OTHER PUBLICATIONS

Sevenich, U.S. Appl. No. 14/969,231, filed Dec. 15, 2015, Office Action, dated Sep. 8, 2017.
(Continued)

*Primary Examiner* — Isaac M Woo
(74) *Attorney, Agent, or Firm* — Hickman Palermo Becker Bingham LLP; Brian N. Miller (57) ABSTRACT

Techniques herein generate, such as during compilation, polymorphic dispatch logic (PDL) to switch between specialized implementations of a polymorphic graph algorithm. In an embodiment, a computer detects, within source logic of a graph algorithm, that the algorithm processes an instance of a generic graph type. The computer generates several alternative implementations of the algorithm. Each implementation is specialized to process the graph instance as an instance of a respective graph subtype. The computer generates PDL that performs dynamic dispatch as follows. At runtime, the PDL receives a graph instance of the generic graph type. The PDL detects which particular graph subtype is the graph instance. The PDL then invokes whichever alternative implementation that is specialized to process the graph instance as an instance of the detected particular graph subtype. In embodiments, the source logic is expressed in a domain specific language (DSL), e.g. for analysis, traversal, or querying of graphs.

20 Claims, 5 Drawing Sheets

(51) Int. Cl.
  *G06F 8/30* (2018.01)
  *G06F 8/41* (2018.01)
  *G06F 16/2453* (2019.01)
  *G06F 8/34* (2018.01)

(58) Field of Classification Search
  USPC .................................................. 707/600–899
  See application file for complete search history.

(56) References Cited

U.S. PATENT DOCUMENTS

| | | | |
|---|---|---|---|
| 6,883,161 B1 | 4/2005 | Chovin et al. | |
| 6,922,830 B1 | 7/2005 | Schmidt | |
| 7,478,375 B1 | 1/2009 | Kersters | |
| 8,910,134 B2 | 12/2014 | Hong | |
| 8,949,811 B2 | 2/2015 | Murthy | |
| 2004/0128661 A1 | 7/2004 | Ghosh | |
| 2004/0133747 A1 | 7/2004 | Coldewey | |
| 2004/0194074 A1 | 9/2004 | Shibayama | |
| 2005/0278451 A1 | 12/2005 | Yamashita | |
| 2006/0195463 A1 | 8/2006 | Bogner | |
| 2010/0023700 A1 | 1/2010 | Chen | |
| 2011/0055511 A1 | 3/2011 | Mantor | |
| 2011/0055819 A1 | 3/2011 | Doyle | |
| 2011/0099541 A1 | 4/2011 | Blornstedt | |
| 2011/0138369 A1 | 6/2011 | Chandra | |
| 2011/0239197 A1 | 9/2011 | Dayan | |
| 2011/0276962 A1 | 11/2011 | Chambers | |
| 2013/0006935 A1* | 1/2013 | Grisby ................. | G06F 16/254 707/635 |
| 2013/0031536 A1 | 1/2013 | De | |
| 2013/0097136 A1 | 4/2013 | Goldberg | |
| 2013/0139135 A1 | 5/2013 | Ditu | |
| 2014/0019949 A1 | 1/2014 | Craymer | |
| 2014/0122812 A1 | 5/2014 | Hakura | |
| 2014/0189665 A1 | 7/2014 | Hong et al. | |
| 2014/0306964 A1 | 10/2014 | Reddish | |
| 2014/0310619 A1 | 10/2014 | Fickenwirth | |
| 2014/0351820 A1 | 11/2014 | Lee | |
| 2015/0007154 A1 | 1/2015 | Bharadwaj | |
| 2015/0040110 A1 | 2/2015 | Adl-Tabatabai | |
| 2015/0067639 A1 | 3/2015 | Pizlo | |
| 2015/0095698 A1 | 4/2015 | Ema | |
| 2015/0128151 A1 | 5/2015 | Rak | |
| 2015/0178405 A1 | 6/2015 | Hong et al. | |
| 2015/0331683 A1 | 11/2015 | Sevenich et al. | |
| 2015/0350324 A1 | 12/2015 | Hu et al. | |
| 2015/0355891 A1 | 12/2015 | Angerer | |
| 2016/0019228 A1 | 1/2016 | Hong | |
| 2016/0048607 A1 | 2/2016 | Raman | |
| 2016/0062776 A1 | 3/2016 | Stanfill | |
| 2016/0117358 A1 | 4/2016 | Schmid | |
| 2016/0342628 A1 | 11/2016 | Rest | |
| 2016/0364220 A1 | 12/2016 | Arai | |
| 2017/0024192 A1 | 1/2017 | Hong et al. | |
| 2017/0168779 A1 | 6/2017 | Sevenich | |

OTHER PUBLICATIONS

Sevenich, U.S. Appl. No. 14/969,231, filed Dec. 15, 2015, Notice of Allowance, dated Jan. 11, 2018.

Sevenich, U.S. Appl. No. 14/805,897, filed Jul. 22, 2015, Adviosry Action, dated Dec. 20, 2017.

Sevenich, U.S. Appl. No. 14/805,897, filed Jul. 22, 2015, Notice of Allowance, dated Jun. 26, 2018.

Sparsity Technologies, "Sparksee User Manual", API, http://www.sparsity-technologies.com/UserManual/API.html, 61 pages, dated 2015.

Sevenich et al., "Using Domain-Specific Languages for Analytic Grpah Database", VLDB Endowment, dated Sep. 2016, pp. 1257-1268.

Schiller et al., "Efficient Data Structures for Dynamic Graph Analysis", IEEE, dated Nov. 2015, pp. 497-504.

Perez et al., "Ringo: Interactive Graph Analytics on Big-Memory Machines", ACM, SIGMOD, dated May 2015, 6 pages.

Hong et al., "Simplifying Scalable Graph Processing with a Domain-Specific Language", ADM, CGO'14, pp. 208-218.

Hong et al., "Green-Marl: A DSL for Easy and Efficient Graph Analysis", ASPLOS'12 Mar. 3-7, 2012, London, England, UK, 14 pages.

Hong et al., "Early Experiences in Using a Domain-Specific Language for Large-Scale Graph Analysis", ACM, Grades, dated 2013, pp. 1-6.

Freeman, Eve, "Getting Started with Neo4j and Cypher", https://www.airpair.com/neo4j/posts/getting-started-with-neo4j-and-cypher, dated Oct. 2016, 12 pages.

Flores et al, "Semantic Data Management in Graph Databases", Tutorial at ESWC 2014-, dated 2014, 153 pages.

Dolby, "Automatic Inline Allocation of Objects", Proceedings of the ACM SIGPLAN Conference on Programming Language Design and Implementation, dated Jun. 1997, vol. 32, Issue 5, pp. 7-17.

Banerjee et al., "Towards Logical Level Design of Big Data", dated Jul. 2015, 7 pages.

Bak et al., "A Reference Interpreter for the Graph Programming Language GP 2", Proc. Graphs as Models (GaM 2015), vol. 181, dated Apr. 2015, 17 pages.

Sevenich, U.S. Appl. No. 14/805,897, filed Jul. 22, 2015, Interview Summary, dated Oct. 26, 2017.

Sevenich, U.S. Appl. No. 14/805,897, filed Jul. 22, 2015, Final Office Action, dated Sep. 14, 2017.

Sevenich, U.S. Appl. No. 14/805,897, filed 22, 2015, Interview Summary, dated Apr. 27, 2018.

\* cited by examiner

METHODS OF GRAPH-TYPE SPECIALIZATION AND OPTIMIZATION IN GRAPH ALGORITHM DSL COMPILATION

FIELD OF THE DISCLOSURE

This disclosure relates to analysis of a logical graph. Presented herein are techniques that generate dispatch logic to switch between specialized implementations of a polymorphic graph algorithm.

BACKGROUND

Graph analysis is a recently popularized way of analyzing associative data, which considers not only the properties of entities but also relationships between them by modeling the data set as a logical graph. Typically, a user applies several graph algorithms on such a graph data model.

When modeling the data set as a graph, the user may want to adopt different types of graphs as naturally suggested by the kind of underlying data. For example, modeling may produce a directed graph (where there is a distinction between two vertices of an edge as source and destination) or as undirected graph (where there is no such distinction).

Most graph algorithms are designed for a generic kind of graph, although some are defined only for specific graph types (e.g. directed graph). When a graph algorithm originally designed for a general graph is applied for specific type of graph, there is an opportunity for performance optimization based on manual redesign. For example, a weakly connected component algorithm designed for directed graphs can be redesigned for a connected component algorithm for undirected graphs.

However, specialized variants of an algorithm for different graph types may introduce costs. Besides being error prone, redesign imposes additional costs, such as code duplication and dual maintenance.

An alternative is to forgo dedicated optimization and instead use a unified (e.g. polymorphic) application programming interface (API) for all graph types for activities such as iterating neighbors of a vertex. A polymorphic API can mask differences in implementations of a graph algorithm, such as different ways that graph edge properties are accessed or different ways of neighbor iteration. However, using a polymorphic API introduces a significant and unnecessary runtime overhead.

Furthermore, using polymorphism may limit the optimizations a domain specific language (DSL) compiler can perform on a graph algorithm. Because a generic graph type is broader, it has less information such as metadata. With less information available, fewer assumptions can be made and, thus, fewer optimizations are available.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described herein according to the following outline:

1.0 General Overview
2.0 Example Computer
   2.1 Polymorphic Graph Algorithm
   2.2 Graph Subtypes
   2.3 Generating Specialized Implementations
   2.4 Polymorphic Dispatch Logic
3.0 Example Code Generation Process
   3.1 Compilation
   3.2 Idiomatic Concerns
   3.3 Intermediate Language
   3.4 Runtime
   3.5 Dynamic Dispatch
   3.6 Visitor
4.0 Complex Graph
   4.1 Bipartite Graph
   4.2 Multigraph
5.0 Hardware Overview
6.0 Software Overview
7.0 Cloud Computing 1.0 General Overview Techniques are provided for generating, such as during compilation, polymorphic dispatch logic to switch between specialized implementations of a polymorphic graph algorithm. In an embodiment, a computer detects, within source logic of a graph algorithm, that the algorithm processes a graph instance of a generic graph type. The computer generates several alternative implementations of the graph algorithm. Each implementation is specialized to process the graph instance as an instance of a respective graph subtype. The computer also generates polymorphic dispatch logic that performs dynamic dispatch as follows. At runtime, the polymorphic dispatch logic receives a graph instance of the generic graph type. The polymorphic dispatch logic detects which particular graph subtype is the graph instance. The polymorphic dispatch logic then invokes whichever alternative implementation that is specialized to process the graph instance as an instance of the detected particular graph subtype.

In embodiments, the source logic is expressed in a domain specific language (DSL), such as a DSL for analysis, traversal, or querying of graphs. In embodiments, the computer generates alternative implementations of the algorithm that are encoded in the same DSL, a general purpose high level programing language, or executable binaries such as machine object code or bytecode.

Each alternative implementation of the algorithm may be dedicated to a graph subtype such as a directed graph, an undirected graph, a bipartite graph, a multigraph, etc. Also provided herein are logic samples for source logic and alternative implementations of a graph algorithm and polymorphic dispatch logic for runtime management of the implementations.

Because these techniques are embeddable within tooling, a compiler (such as a Green-Marl compiler) may be enhanced to exploit various assumptions that regard particular graph subtypes. That facilitates configuring the alternative implementations with various performance optimizations in time and space such that a generated implementation may outperform generic source logic of a graph algorithm for a respective graph subtype. Thus, these techniques may improve the performance of graph analysis. Therefore, the performance of a computer executing the graph algorithm at runtime is itself improved.

2.0 Example Computer

Figure 1:
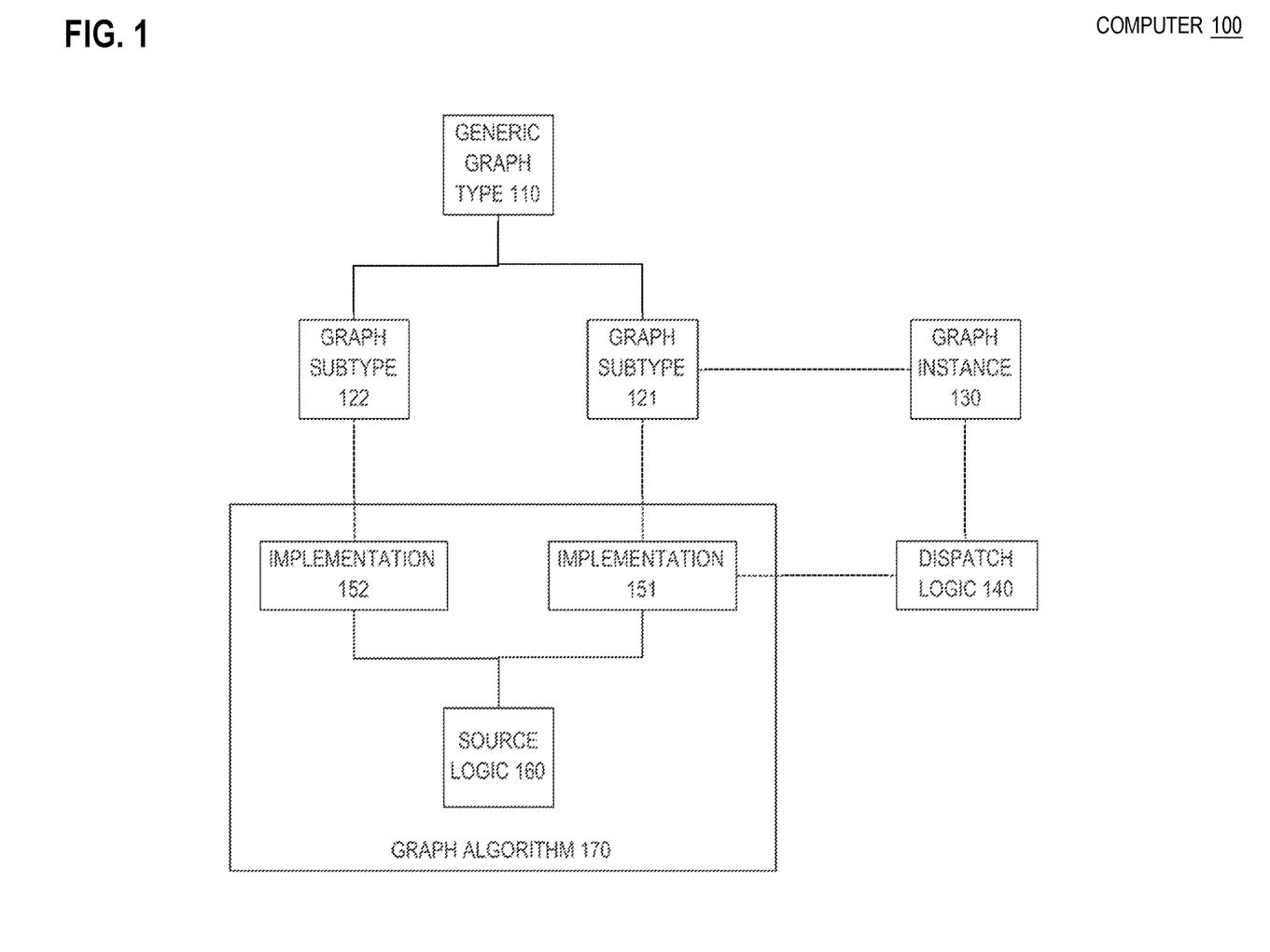
FIG. 1 is a block diagram that depicts an example computer that generates dispatch logic to switch between specialized implementations of a polymorphic graph algorithm, in an embodiment.

FIG. 1 is a block diagram that depicts an example computer 100, in an embodiment. Computer 100 generates polymorphic dispatch logic to switch between specialized implementations of a polymorphic graph algorithm.

Computer 100 optimizes polymorphic graph algorithms, such as 170, to process graphs of particular kinds, such as 121-122. Computer 100 may be one or more of a rack server such as a blade, a mainframe, a personal computer, a smartphone, or other computing device able to load and analyze a logical graph, such as 130.

2.1 Polymorphic Graph Algorithm

Graph algorithm 170 may be defined by source logic such as 160. Source logic 160 specifies reusable graph analysis to be performed on a variety a graphs.

Source logic 160 may be encoded in a dedicated graph language, such as a domain specific language (DSL) such as Green-Marl. Source logic 160 may be encoded in a general purpose programming language such as C++ or Java.

Source logic 160 may be encoded in a declarative language such as Cypher. Source logic 160 may be encoded in an imperative language such as Green-Marl.

2.2 Graph Subtypes

Graph algorithm 170 and source logic 160 are polymorphic. They are designed to process a graph in a general way that can be used with a variety of kinds of graphs such as 121-122.

Although source logic 160 may process graph subtypes 121-122, source logic 160 achieves polymorphism by exclusively targeting a single abstract graph type, 110, for which actual graph types 121-122 are subtypes. For example, graph instance 130 is an example of graph subtype 121. Graph instance 130 may be processed generally as an instance of generic graph type 110 or specially and optimally processed as an instance of graph subtype 121.

For example, graph subtype 121 may be a directed graph. Likewise, graph subtype 122 may be an undirected graph.

Those distinctions arise because graph edges that connect vertices may be directed or undirected. Graph instance 130 may be processed as a directed graph (graph subtype 121) having directed edges or processed without regard to edge type as a generic graph type 110.

2.3 Generating Specialized Implementations

In operation, computer 100 compiles source logic 160 into multiple translations, such as 151-152, that is each optimized for a particular subtype of generic graph type 110. For example, computer 100 may host a compiler that generates implementation 152 for optimal application of graph algorithm 170 for graph instances of graph subtype 122.

Likewise, the compiler may generate implementation 151 for optimal application of graph algorithm 170 for graph instances of graph subtype 121. For example, implementation 151 is optimal for graph instance 130 because graph instance 130 is an instance of graph subtype 121.

2.4 Polymorphic Dispatch Boilerplate

As shown, computer 100 may subsequently load graph instance 130 and execute implementation 151 upon graph instance 130. In embodiments, computer 100 does not load graph instance 130 and instead makes implementations 151-152 (and dispatch logic 140) available to another computer that loads graph instance 130 and performs graph algorithm 170.

In addition to generating implementations 151-152, computer 100 also generates dispatch logic 140. Dispatch logic 140 is configured to select, during execution of graph algorithm 170, whichever of implementations 151-152 is optimal for graph instance 130.

Dispatch logic 140 may inspect graph instance 130 to dynamically detect which graph subtype 121-122 does graph instance 130 conform to. For example, graph instance 130 may have metadata, such as static typing, that indicates to dispatch logic 140 that graph instance 130 is an example of graph subtype 121 or 122.

For example, graph instance 130 may be constructed by a factory or loader that uses a particular object oriented type or class to encode graph instance 130 based on the graph subtype of graph instance 130. For example, graph instance 130 may be an instantiation of an actual class that is specialized for a directed graph.

In embodiments, computer 100 generates an additional generic implementation (not shown) for graph algorithm 170 that treats graph instance 130 merely as an instance of generic graph type 110. Thus, dispatch logic 140 may fallback upon the generic implementation if the subtype of graph instance 130 is unrecognizable, unsupported, too expensive in time or space to detect, or otherwise inconvenient. Various techniques and mechanisms for configuring dispatch logic 140 are discussed later herein.

3.0 Example Code Generation Process

Figure 2:
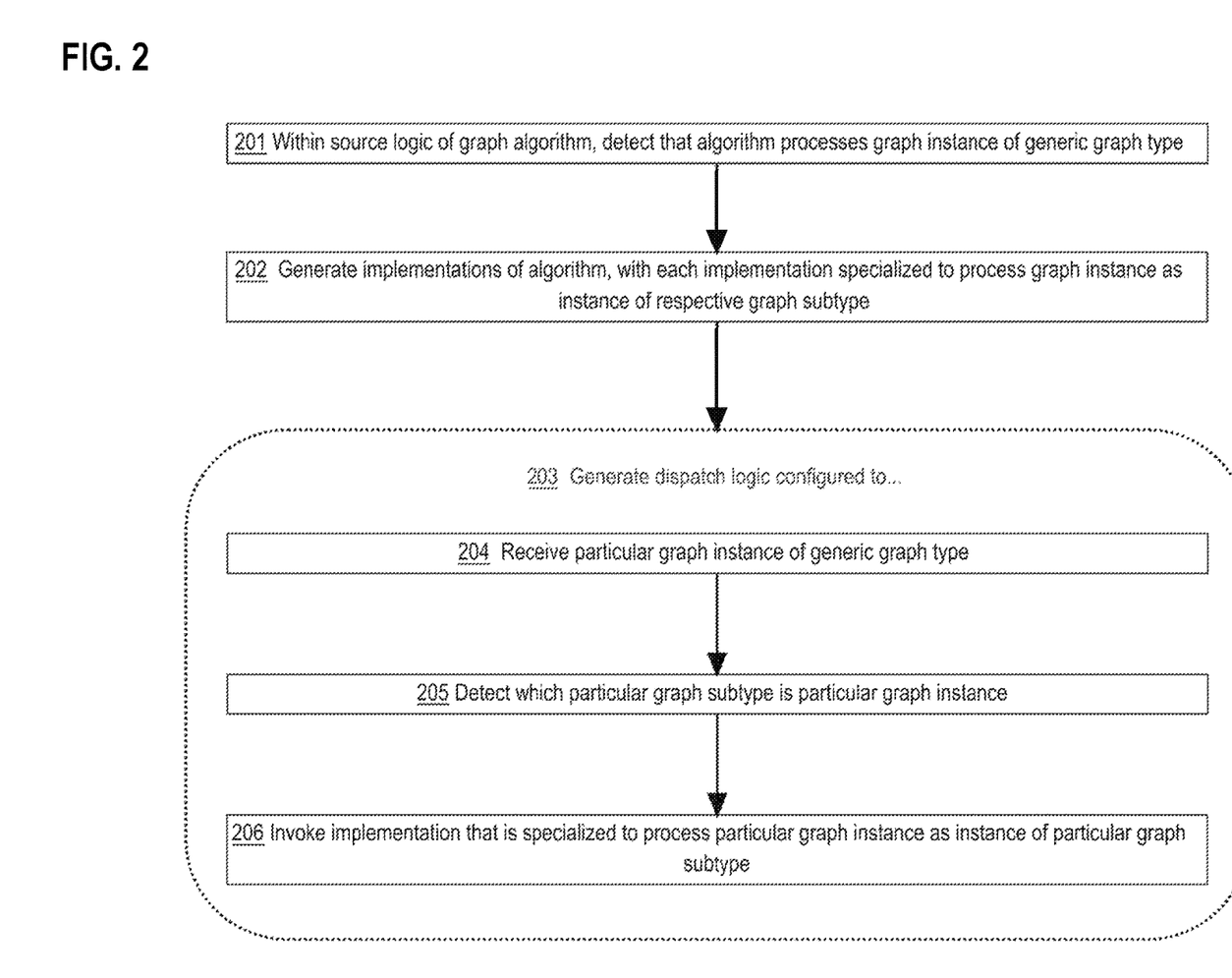
FIG. 2 is a flow diagram that depicts an example process that generates dispatch logic to switch between specialized implementations of a polymorphic graph algorithm, in an embodiment.

FIG. 2 is a flow diagram that depicts an example process that generates dispatch logic to switch between specialized implementations of a polymorphic graph algorithm. FIG. 2 is discussed with reference to FIG. 1.

3.1 Compilation

Steps 201-203 occur during compilation of source logic. For example, computer 100 may host a Green-Marl compiler that compiles source logic 160 into implementations 151-152.

In step 201 the computer detects, within source logic of graph algorithm, that an algorithm processes a graph instance of a generic graph type. For example, source logic 160 may include the following Green-Marl source logic, generic snippet A.

```
procedure test(G: graph; prop: edgeProperty<int>) {
    foreach(e: G.edges) {
        e.prop++;
    }
}
```

During compilation, the parameter 'G' has type 'graph' that is a generic graph type, such as 110. Whereas at runtime, 'G' could be an instance of graph subtype 121 or 122.

For example at runtime, 'G' may or may not actually be an instance of graph subtype 121 such as graph instance 130. Thus in step 202, the computer generates algorithm implementations that are each specialized to process a graph instance as an instance of a respective graph subtype.

For example, the compiler translates source logic 160 to generate implementation alternatives 151-152 for respective graph subtypes 121-122. For example, graph subtype 121 may be a directed graph, and graph subtype 122 may be an undirected graph.

Thus, the compiler generates specialized Green-Marl snippet B that treats 'G' as an instance of a directed graph as follows.

```
procedure test(G: dGraph; prop: edgeProperty<int>) {
    foreach(e: G.edges) {
        prop.set(e, prop.get(e) + 1);
    }
}
```

The parameter 'G' has type 'dGraph' that is a directed graph type, such as 121. Thus, snippet B narrows snippet A for a directed graph.

Snippet A may be invoked for a directed or undirected graph. Snippet B may perform better but can only be invoked for a directed graph.

The compiler also generates specialized Green-Marl snippet C that treats 'G' as an instance of an undirected graph as follows.

```
procedure test(G: uGraph; prop: edgeProperty<int>) {
    foreach(e: G.edges) {
        prop.set(G.edgeIdToIndex(e), prop.get(G.edgeIdToIndex(e) + 1);
    }
}
```

The parameter 'G' has type 'uGraph' that is a directed graph type, such as 122. Thus, snippet C narrows snippet A for an undirected graph. Snippet C may outperform snippet A but can only be invoked for an undirected graph.

3.2 Idiomatic Concerns

In embodiments, there may be idiomatic concerns such as consequences of how edges are stored in memory that impact snippet B or C. For example, a directed edge may be naturally stored according to which vertex the edge originates from, but not which vertex the edge terminates at.

Whereas, there is no distinction between originating and terminating for an undirected edge. Thus, edge storage may naturally fit iteration of directed edges better than undirected edges or vice versa.

Thus, aspects such as edge iteration may need to be implemented with different idioms for snippets B-C. For example, snippet C translates an exposed identifier of an undirected edge into an internal identifier of the same edge. For example the edgeIdToIndex( ) method may use a lookup table or other associative mapping to translate edge identifiers. For example, an edge may be exposed with an identifier such as a unique name or an array index that needs translation to an internal identifier such as an object reference or an index of a different array.

3.3 Intermediate Language

Although source snippet A is valid Green-Marl source logic, generated implementation snippets B-C are demonstrative and need not be valid Green-Marl. That is because snippets B-C may be an intermediate representation that only exists within the compiler's memory.

For example, the backend of the compiler may further translate snippets B-C into implementations 151-152 as object code (machine language binaries), bytecode, or general purpose high level language source logic such as C++ or Java. When implementations 151-152 occur in a high level source language, a second phase of compilation may be need to translate the high level source language into object code or bytecode.

Thus in embodiments, the compiler translates Green-Marl into an intermediate language as a preface to generation of executable binaries. In other embodiments, the compiler uses no intermediate language in between consuming Green-Marl and producing binaries.

For example, the compiler may translate snippet B to generate implementation 151 as the following specialized Java snippet D.

```
public void test(DirectedGraph G, EdgeProperty<Integer> prop) {
    for(DirectedEdge e: G.getEdges( ))
        prop.set(e, prop.get(e) + 1);
}
```

Likewise, the compiler may translate snippet C to generate implementation 152 as the following specialized Java snippet E.

```
public void test(UndirectedGraph G, EdgeProperty<Integer> prop) {
    for(UndirectedEdge e: G.getEdges( )) {
        int index = G.edgeIdToIndex(e);
        prop.set(index, prop.get(index) + 1);
    }
}
```

3.4 Runtime

In step 203, the computer generates dispatch logic to dynamically switch between implementations 151-152 (snippets D-E) at runtime. Thus, step 203 occurs during compilation but generates dispatch logic that performs steps 204-206 at runtime. Thus, steps 203-204 may be separated by an arbitrarily long delay and may be performed on different computers.

For example in step 203, the compiler generates the following Java dispatch snippet F as dispatch logic 140 that uses runtime type information and down casting to perform dynamic dispatch to snippet D or E.

```
public void test(Graph G, EdgeProperty<Integer> prop) {
    if (G instanceof DirectedGraph) {
        test((DirectedGraph) G, prop);
    } else if (G instanceof UndirectedGraph) {
        test((UndirectedGraph) G, prop);
    } else {
        assert false; // should not happen as the compiler knows all types
    }
}
```

In embodiments such as snippet F, the specializations of snippets D-E and the dispatch of snippet F may overload a same method name. For example, snippets D-F each defines a different method having a same name 'test' and different argument signatures.

In step 204, dispatch logic receives a graph instance as a generic graph type. For example, a runtime computer loads graph instance 130 from a file, a database, a stream, or a resource description framework (RDF) triplestore. The runtime computer invokes the test method defined in snippet F as dispatch logic 140 and passes in graph instance 130 as argument generic Graph G.

3.5 Dynamic Dispatch

In step 205, the dispatch logic detects which particular graph subtype is the graph instance. For example, snippet F as dispatch logic 140 uses cascaded instanceof operators to perform runtime type identification to detect the actual graph subtype for Graph G.

In step 206, the dispatch logic invokes an implementation of a graph algorithm that is specialized to process the graph instance as an instance of a particular graph subtype. For example, the runtime computer uses down casting to narrow Graph G to the actual graph subtype for Graph G.

For example, snippet F down casts Graph G to be a DirectedGraph. Dispatch snippet F invokes the test method of specialized snippet D that actually performs graph algorithm 170.

Graph algorithm 170 may be invoked by different parts of graph analytics software application. Thus, steps 204-206 may be repeated for each invocation of graph algorithm 170.

Graph algorithm 170 may be part of a larger graph analytics software application. The analytics application may embody other graph algorithms besides 170. Thus, steps 201-203 may be repeated for each graph algorithm of the analytics application.

3.6 Visitor

Snippet F uses dynamic dispatch to implement dispatch logic 140. Unlike object-oriented dynamic dispatch that uses method overriding, the dynamic dispatch of snippet F separates structure (graph subtypes 121-122) from behavior (implementations 151-152).

Visitor is another software design pattern that decouples structure from behavior, which is a form of dynamic dispatch that is somewhat more invasive. In embodiments, implementations 151-152 are (possibly polymorphic) visitors that graph subtypes 121-122 accept.

4.0 Complex Graph

Figure 3:
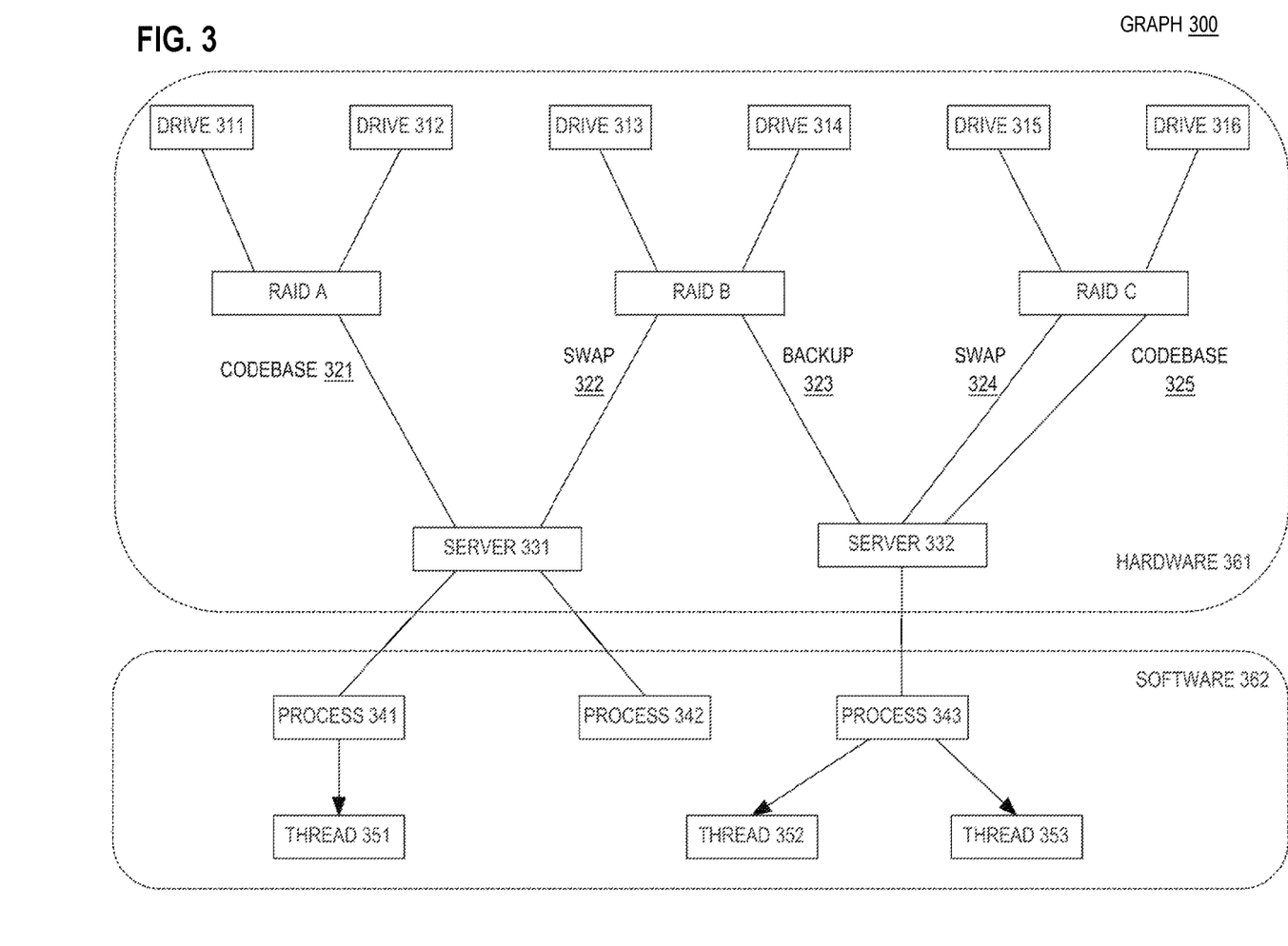
FIG. 3 is an object diagram that depicts a graph having topological features that are amenable to logic optimizations, in an embodiment.

FIG. 3 is an object diagram that depicts an example graph 300, in an embodiment. Graph 300 has topological features that are amenable to logic optimizations.

Techniques presented herein exploit which kind of logical embodiment does a graph have. For example, different optimizations may be used depending on whether a graph is directed or undirected.

However, such logical embodiment of a graph is conceptually unrelated to the knowledge domain of the graph. For example, the techniques herein work regardless of whether a directed graph is for a social network or for chemical reaction pathways.

Thus, it is irrelevant what is the knowledge domain of graph 300. Although in this example, graph 300 represents a logical topology of a computer cluster having vertices and edges of various types that are typical of components of a computer cluster.

The vertices of graph 300 are drives 311-316, RAID arrays A-C, computer servers 331-332, operating system processes 341-343, and lightweight computational threads 351-353. Each server may use multiple RAID arrays for storage. For example, server 331 uses RAID arrays A-B.

Each RAID array may be shared by multiple servers. For example, servers 331-332 share RAID array B.

Each RAID array may be composed of multiple storage drives. For example, RAID array A is composed of drives 311-312.

Each server may host multiple software processes. For example, server 331 hosts processes 341-342.

Each process may host multiple computational threads. For example, process 343 hosts threads 352-353.

4.1 Bipartite Graph

Graph 300 is a bipartite graph. A bipartite graph may have many kinds of vertices. For example, graph 300 has vertices for drives, RAID arrays, servers, processes, and threads.

However, a bipartite graph has two kinds of vertices that interconnect without connecting vertices of a same kind of the two kinds. For example, graph 300 has servers 331-332 that are connected to processes 341-343.

Whereas, servers 331-332 do not connect to each other. Likewise, processes 341-343 do not connect with each other. Thus, graph 300 has a set of servers as one kind of vertices and a set of processes as another kind of vertices.

The set of server vertices is disjoint (not overlapping) the set of process vertices. The set of server vertices is connected by graph edges to the set of process vertices.

Thus, graph 300 is bipartite, which means that graph 300 may be conceptually divided into a pair of different subgraphs, 361-362. Furthermore, graph 300 may be stored and/or loaded expressly as a bipartite graph.

Thus, the loaded structure of graph 300 may include metadata or structural alignment that directly indicates that graph 300 is a bipartite graph composed of subgraphs 361-362. Thus, dispatch logic may readily recognize graph 300 as bipartite and treat subgraphs 361-362 as logically distinct.

Thus, the dispatch logic may decide to process subgraphs 361-362 more or less separately. For example, the dispatch logic may dynamically select one compiled analysis implementation for hardware 361 and another compiled analysis implementation for software 362.

For example, the dispatch logic may detect from metadata, structure, or other inspection that software 362 is a directed graph. Whereas, hardware 361 is an undirected graph.

4.2 Multigraph

Alternatively or additionally, the dispatch logic may detect that hardware 361 is a multigraph (i.e. having parallel edges that connect a same pair of vertices). For example, divergent edges 321-322 indicate that server 331 uses separate RAID arrays A-B respectively for codebase executable storage and virtual memory swapping. Whereas, parallel edges 324-325 indicate that server 332 uses same RAID array C for both purposes.

Thus, hardware 361 is a multigraph. Whereas, software 362 is a simple graph (lacking parallel edges).

A graph algorithm may be compiled into different implementations that handle a multigraph, a simple graph, a bipartite graph, a directed graph, an undirected graph, and/or combinations thereof. The dispatch logic may detect which implementation(s) are optimal for graph 300 and/or for some part of graph 300, such as subgraph 361 or 362.

5.0 Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
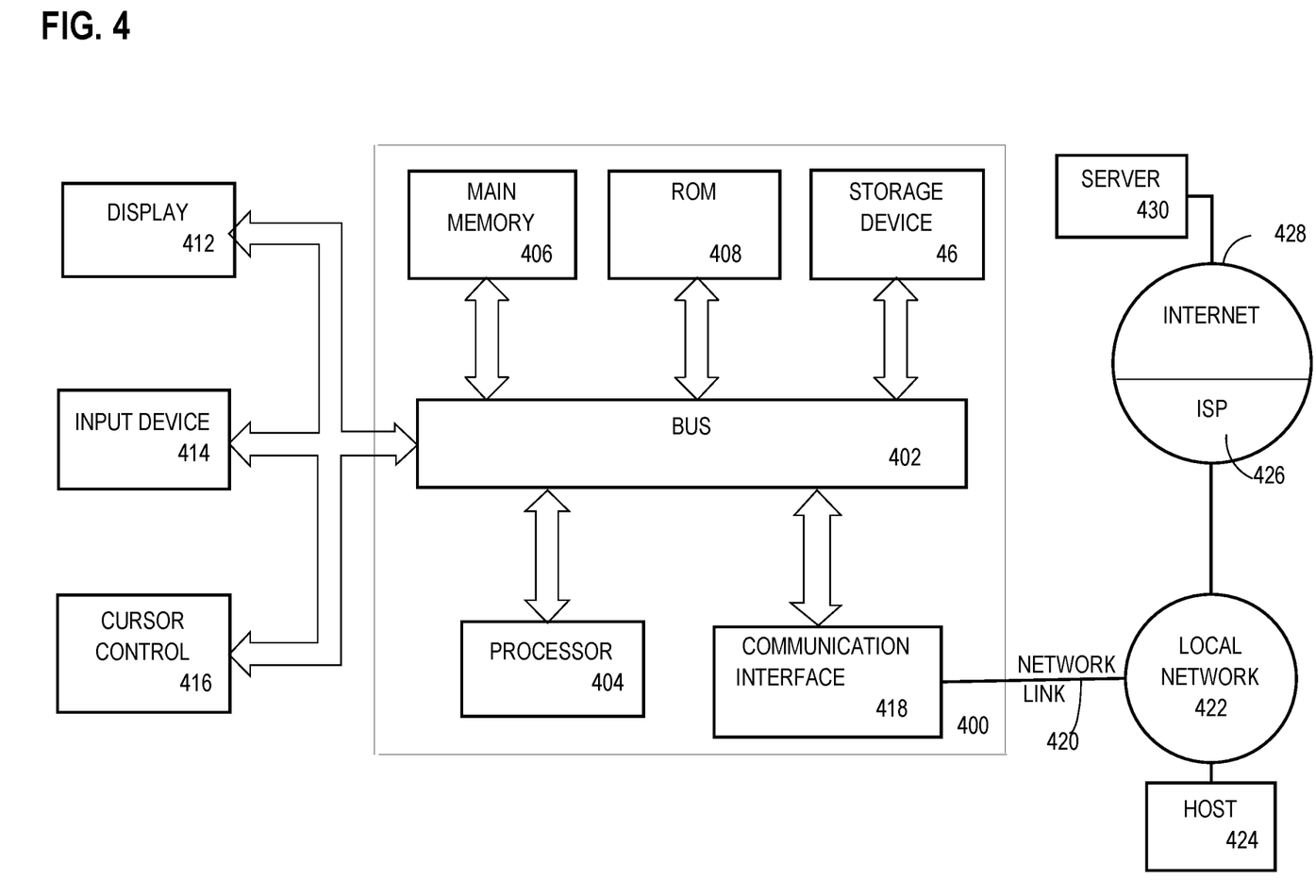
FIG. 4 is a block diagram that illustrates a computer system upon which an embodiment of the invention may be implemented.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 46, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 46. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 46. Volatile media includes dynamic memory, such as main memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 46 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 46, or other non-volatile storage for later execution.

6.0 Software Overview

Figure 5:
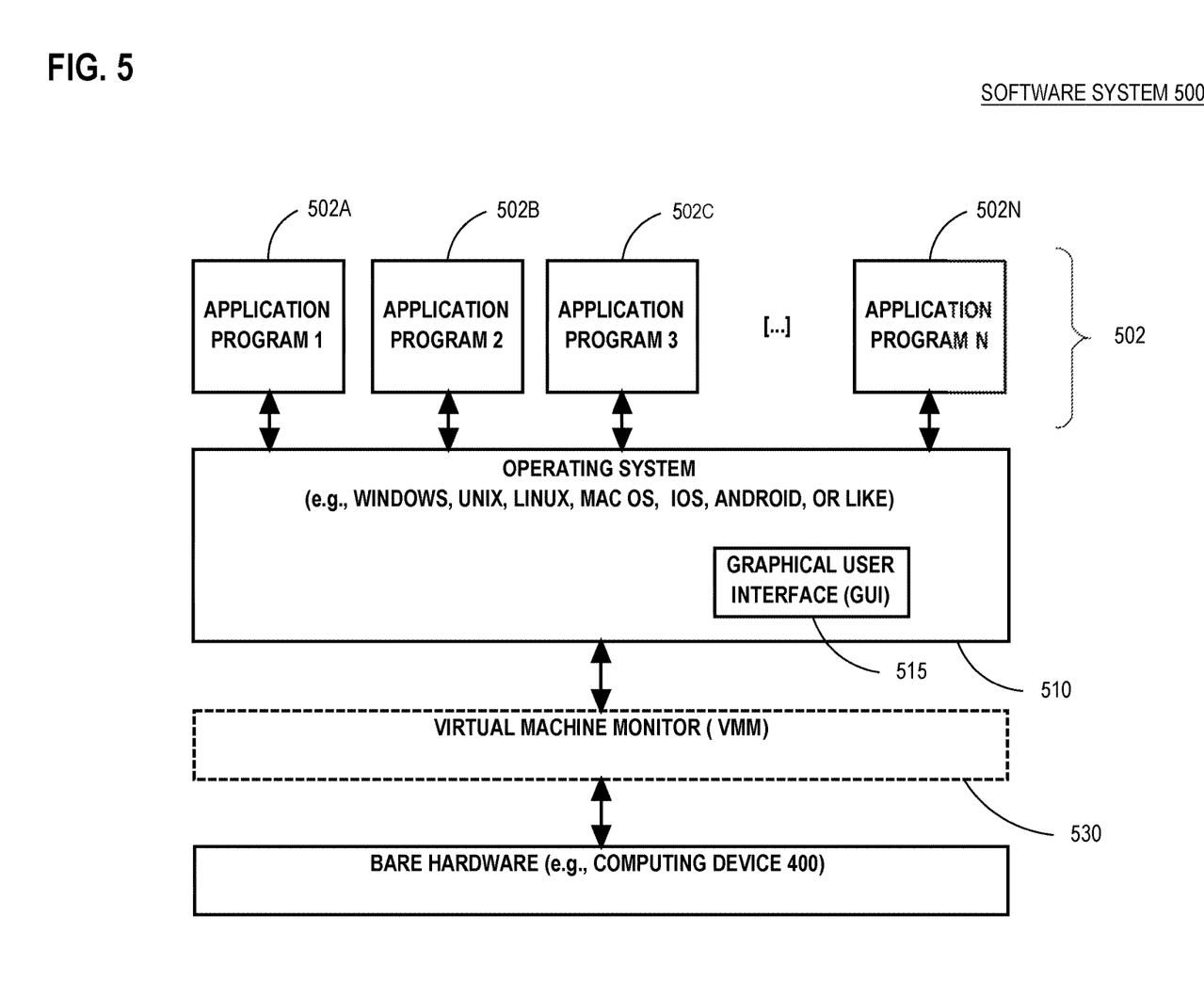
FIG. 5 is a block diagram that illustrates a basic software system that may be employed for controlling the operation of a computing system.

FIG. 5 is a block diagram of a basic software system 500 that may be employed for controlling the operation of computing system 400. Software system 500 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 500 is provided for directing the operation of computing system 400. Software system 500, which may be stored in system memory (RAM) 406 and on fixed storage (e.g., hard disk or flash memory) 46, includes a kernel or operating system (OS) 510.

The OS 510 manages low-level aspects of computer operation, including managing execution of processes, memory allocation, file input and output (I/O), and device I/O. One or more application programs, represented as 502A, 502B, 502C . . . 502N, may be "loaded" (e.g., transferred from fixed storage 46 into memory 406) for execution by the system 500. The applications or other software intended for use on computer system 400 may also be stored as a set of downloadable computer-executable instructions, for example, for downloading and installation from an Internet location (e.g., a Web server, an app store, or other online service).

Software system 500 includes a graphical user interface (GUI) 515, for receiving user commands and data in a graphical (e.g., "point-and-click" or "touch gesture") fashion. These inputs, in turn, may be acted upon by the system 500 in accordance with instructions from operating system 510 and/or application(s) 502. The GUI 515 also serves to display the results of operation from the OS 510 and application(s) 502, whereupon the user may supply additional inputs or terminate the session (e.g., log off).

OS 510 can execute directly on the bare hardware 520 (e.g., processor(s) 404) of computer system 400. Alternatively, a hypervisor or virtual machine monitor (VMM) 530 may be interposed between the bare hardware 520 and the OS 510. In this configuration, VMM 530 acts as a software "cushion" or virtualization layer between the OS 510 and the bare hardware 520 of the computer system 400.

VMM 530 instantiates and runs one or more virtual machine instances ("guest machines"). Each guest machine comprises a "guest" operating system, such as OS 510, and one or more applications, such as application(s) 502, designed to execute on the guest operating system. The VMM 530 presents the guest operating systems with a virtual operating platform and manages the execution of the guest operating systems.

In some instances, the VMM 530 may allow a guest operating system to run as if it is running on the bare hardware 520 of computer system 500 directly. In these instances, the same version of the guest operating system configured to execute on the bare hardware 520 directly may also execute on VMM 530 without modification or reconfiguration. In other words, VMM 530 may provide full hardware and CPU virtualization to a guest operating system in some instances.

In other instances, a guest operating system may be specially designed or configured to execute on VMM 530 for efficiency. In these instances, the guest operating system is "aware" that it executes on a virtual machine monitor. In other words, VMM 530 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

7.0 Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprise two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure and applications.

The above-described basic computer hardware and software and cloud computing environment presented for purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   detecting, within source logic of an algorithm, that the algorithm processes a graph as an instance of a generalized graph type of a plurality of graph subtypes;
   generating a plurality of alternate implementations of the algorithm, wherein each implementation of the plurality of alternate implementations is specialized to process same said graph instance as an instance of a respective graph subtype of the plurality of graph subtypes;
   generating polymorphic dispatch logic configured to:
      receive a particular graph that is an instance of the generic graph type;
      detect which particular graph subtype of the plurality of graph subtypes is the particular graph;
      invoke only one implementation, of the plurality of alternate implementations of the algorithm, that is specialized to process the particular graph as an instance of the particular graph subtype;
   wherein the method is performed by one or more computers.

2. The method of claim 1 wherein generating the plurality of alternate implementations of the algorithm comprises generating at least one of: C++ source logic, Java source logic, or Java bytecode.

3. The method of claim 1 wherein the source logic of the algorithm comprises a domain specific language (DSL).

4. The method of claim 3 wherein the DSL comprises Green-Marl.

5. The method of claim 3 wherein generating the plurality of alternate implementations of the algorithm comprises transforming the source logic into a transformed source logic for the DSL.

6. The method of claim 1 wherein the plurality of graph subtypes comprises both of: a directed graph subtype and an undirected graph subtype.

7. The method of claim 1 wherein the plurality of graph subtypes comprises both of: a multigraph graph subtype that has parallel edges and a graph subtype that does not have parallel edges.

8. The method of claim 1 wherein:
   the generic graph type is a bipartite graph comprising:
      a first graph subtype that contains vertices of a first vertex type, and
      a second graph subtype that contains vertices of a second vertex type;
   the plurality of graph subtypes comprises at least the first graph subtype and the second graph subtype.

9. The method of claim 1 wherein generating the plurality of alternate implementations of the algorithm comprises generating logic to translate a first identifier of an edge of the particular graph to a second identifier of the edge of the particular graph.

10. The method of claim 1 wherein generating the plurality of alternate implementations of the algorithm comprises generating a plurality of subroutines that share an overloaded subroutine name and do not share a same signature.

11. One or more non-transitory computer-readable media storing instructions that, when executed by one or more processors, cause:
   detecting, within source logic of an algorithm, that the algorithm processes a graph as an instance of a generalized graph type of a plurality of graph subtypes;
   generating a plurality of alternate implementations of the algorithm, wherein each implementation of the plurality of alternate implementations is specialized to process same said graph as an instance of a respective graph subtype of the plurality of graph subtypes;
   generating polymorphic dispatch logic configured to:
      receive a particular graph that is an instance of the generic graph type;
      detect which particular graph subtype of the plurality of graph subtypes is the particular graph;
      invoke only one implementation, of the plurality of alternate implementations of the algorithm, that is specialized to process the particular graph as an instance of the particular graph subtype.

12. The one or more non-transitory computer-readable media of claim 11 wherein generating the plurality of alternate implementations of the algorithm comprises generating at least one of: C++ source logic, Java source logic, or Java bytecode.

13. The one or more non-transitory computer-readable media of claim 11 wherein the source logic of the algorithm comprises a domain specific language (DSL).

14. The one or more non-transitory computer-readable media of claim 13 wherein the DSL comprises Green-Marl.

15. The one or more non-transitory computer-readable media of claim 13 wherein generating the plurality of alternate implementations of the algorithm comprises transforming the source logic into a transformed source logic for the DSL.

16. The one or more non-transitory computer-readable media of claim 11 wherein the plurality of graph subtypes comprises both of: a directed graph subtype and an undirected graph subtype.

17. The one or more non-transitory computer-readable media of claim 11 wherein the plurality of graph subtypes comprises both of: a multigraph graph subtype that has parallel edges and a graph subtype that does not have parallel edges.

18. The one or more non-transitory computer-readable media of claim 11 wherein:
   the generic graph type is a bipartite graph comprising:
      a first graph subtype that contains vertices of a first vertex type, and
      a second graph subtype that contains vertices of a second vertex type;
   the plurality of graph subtypes comprises at least the first graph subtype and the second graph subtype.

19. The one or more non-transitory computer-readable media of claim 11 wherein generating the plurality of alternate implementations of the algorithm comprises generating logic to translate a first identifier of an edge of the particular graph to a second identifier of the edge of the particular graph.

20. The one or more non-transitory computer-readable media of claim 11 wherein generating the plurality of alternate implementations of the algorithm comprises generating a plurality of subroutines that share an overloaded subroutine name and do not share a same signature.

\* \* \* \* \*